(12) United States Patent
Dalamarinis et al.

(10) Patent No.: US 11,661,842 B2
(45) Date of Patent: May 30, 2023

(54) METHOD OF LOGGING OF NATURAL FRACTURES DURING DRILLING, MONITORING AND ADJUSTING DRILLING OPERATIONS AND OPTIMIZING COMPLETION DESIGNS

(71) Applicant: Seismos, Inc., Austin, TX (US)

(72) Inventors: Panagiotis Dalamarinis, Auston, TX (US); Jakub Felkl, Austin, TX (US)

(73) Assignee: Seismos, Inc., Austin, TX (US)

( * ) Notice: Subject to any disclaimer, the term of this patent is extended or adjusted under 35 U.S.C. 154(b) by 0 days.

(21) Appl. No.: 17/156,210

(22) Filed: Jan. 22, 2021

(65) Prior Publication Data
US 2021/0231010 A1    Jul. 29, 2021

Related U.S. Application Data

(60) Provisional application No. 62/964,883, filed on Jan. 23, 2020.

(51) Int. Cl.
*E21B 49/00* (2006.01)
*E21B 43/267* (2006.01)
*E21B 7/04* (2006.01)

(52) U.S. Cl.
CPC .............. *E21B 49/003* (2013.01); *E21B 7/04* (2013.01); *E21B 43/267* (2013.01)

(58) Field of Classification Search
CPC ........ E21B 43/26; E21B 43/267; E21B 44/00; E21B 44/005; E21B 47/14; E21B 47/095; E21B 49/003; G01V 1/48
See application file for complete search history.

(56) References Cited

FOREIGN PATENT DOCUMENTS

| CA | 2799719 A1 | * | 11/2011 | ............. E21B 43/26 |
| WO | WO-2009073520 A1 | * | 6/2009 | ............. E21B 43/00 |

* cited by examiner

*Primary Examiner* — Zakiya W Bates
(74) *Attorney, Agent, or Firm* — Richard A. Fagin

(57) ABSTRACT

A method for steering a well based on rock properties and obtaining natural fracture information includes inducing tube waves in the well during drilling the well. Acoustic energy is measured in the well. The energy comprises tube wave reflections from formations adjacent to the well. The measured acoustic energy is inverted to determine at least one of a rock property, a near wellbore hydraulic conductivity, and natural fracture occurrence. A trajectory of the well is adjusted to maintain the at least one of a rock property, near wellbore hydraulic conductivity and natural fracture occurrence. An n optimized, well-customized hydraulic fracturing design may be created based on the measured natural fracture properties. A method to optimize hydraulic fracturing treatment based on measured natural fracture properties during drilling.

10 Claims, 11 Drawing Sheets

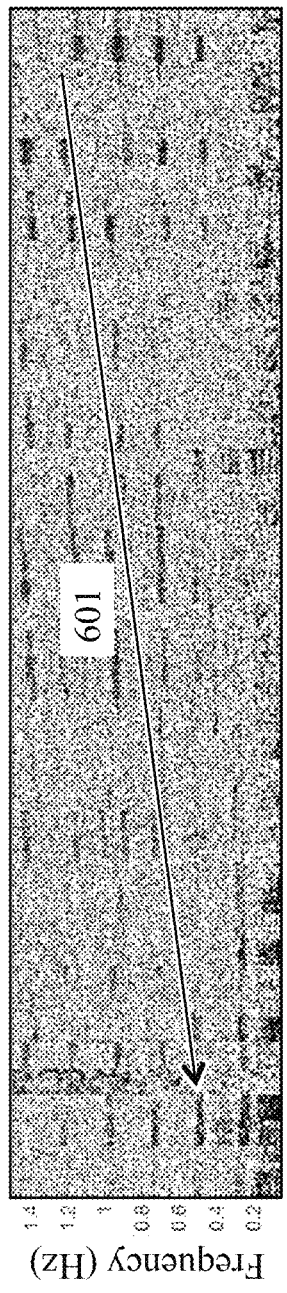
FIG. 6A
FIG. 6B

910 Create a natural fracture "log" based on the measurements

920 Prepare a hydraulic fracturing design taking the information in step I. into account

930 Treat the various regions of the well with separate designs to achieve optimally desired parameters

940 If necessary, adjust treatment of subsequent wells or zones based on logs and information learned from 910-930

*FIG. 9*

```
1001. Create a natural fracture "log" based on the
measurements at a particular uncased segment
```

```
1002. Correlate the "log" from 1001 to lithology or other
known characteristics of the formation
```

```
1003. Continue drilling and create a natural fracture log at
another uncased segment
```

```
1004. Correlate the natural fracture log at the next
uncased segment to lithology
```

*FIG. 10*

METHOD OF LOGGING OF NATURAL FRACTURES DURING DRILLING, MONITORING AND ADJUSTING DRILLING OPERATIONS AND OPTIMIZING COMPLETION DESIGNS

CROSS REFERENCE TO RELATED APPLICATIONS

Priority is claimed in U.S. Provisional Application No. 62/964,883 filed on Jan. 23, 2020 and incorporated herein by reference.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

The present disclosure generally relates to a method for evaluating a subterranean rock formation during a deviated drilling operation. More specifically, this disclosure relates to a method for diagnosing natural (i.e. pre-existing, reservoir) fractures and related reservoir properties at the drilling depth using acoustic (tube wave) measurements. Such properties may, for example, be used in the process of directional drilling and completions of unconventional wells.

In a typical drilling operation, a well is drilled through a subterranean formation by a rotary table drilling unit ("rig") or a top drive drilling unit suspending drill string components in a wellbore. Such components may include a drill bit. As the drill bit cuts through the rock formations, the drilling rig operator may from time to time pause the drilling operation in order to insert pipe, casing or liner to protect the drilled wellbore in casing drilling operations. A casing or liner system in a well may consist of sections such as: (i) a Conductor Pipe to protect against surface erosion; (ii) a Surface Casing to isolate the well flow stream from shallow formations to prevent, e.g., groundwater contamination; (iii) an Intermediate Casing protecting the wellbore against breakable formation and which is usually set before a Kick-off-Point (KOP, that is, the position in the well at which directional drilling begins). Casing sections forming "strings" are added from the drilling unit surface location, and are assembled by coupling segments ("joints") together end to end, typically using threaded casing "collars". Before inserting the casings or liners, and during the drilling operations, the reservoir formation is exposed to the wellbore fluid. At this point, prior to insertion of any casing, reservoir natural fractures (and other features, such as formation faults) are exposed to the well. Obtaining detailed information about the natural fractures and their hydraulic conductivity, in combination with other information obtained from the drilling process, e.g., drilling fluid ("mud") flow in and flow out, mud losses, azimuthal gamma ray measurements, directional survey data, rate of penetration of the drilling procedure, drilling mud density ("weight"), mud viscosity, etc., can be useful to improve planning for upcoming hydraulic fracture treatments, or even for the drilling operation itself.

Currently, the best known way an operator may determine density of natural fractures prior to well completion is in uncased wellbores by running a camera or other imaging tool after drilling is completed and performing image. This process presents delays, costs, and risks of downhole tools getting stuck in the well. Based on the image analysis, the operator can then identify which zones to target and treat, either using sliding sleeves or packers to isolate certain depth intervals in the well with good natural fractures, and not treating zones without good natural fracturing. It is desirable to have a method for identifying zones in a well having good natural fracturing for subsequent treatment without the need to wait for drilling to come to an end, and without the need to use expensive well logging instruments to obtain the needed information.

SUMMARY

A method for steering a well drilling based on rock properties according to one aspect of this disclosure includes inducing tube waves in the well during drilling the well. Acoustic energy is measured in the well. The measured energy comprises tube wave reflections from formations adjacent to the well. The measured acoustic energy is inverted to determine at least one of a rock property, a near wellbore hydraulic conductivity, and natural fracture occurrence. A trajectory of the well is adjusted to maintain the at least one of a rock property, near wellbore hydraulic conductivity and natural fracture occurrence.

In some embodiments, the inducing tube waves comprises operating a pulsed acoustic source in the well.

In some embodiments, the inducing tube waves comprises switching a pump on or off.

In some embodiments, the determined wellbore hydraulic conductivity is related to a natural fracture property in the near wellbore region.

A method according to another aspect of this disclosure for creating a log of natural fracture properties along a well while drilling includes inducing tube waves in the well during drilling the well. Acoustic energy is measured in the well. The energy comprising tube wave reflections from formations adjacent to the well. The measured acoustic energy is inverted to determine at least one of a rock property, a near wellbore hydraulic conductivity, and natural fracture occurrence. A log of such property is generated along the wellbore.

A method for optimizing well completion based on pre-existing natural fracture properties according to another aspect of this disclosure includes determining at least one of a rock property, a near wellbore hydraulic conductivity, and natural fracture occurrence during drilling the well using detected reflections from tube waves propagating in the well. A record is created with respect to axial position along the well of the determined at least one of a rock property, a near well hydraulic conductivity and natural fracture occurrence. Axial intervals are selected in the well having the at least one of a rock property, a near well hydraulic conductivity and natural fracture occurrence within a selected range. The method includes hydraulically connecting the selected axial intervals to the well and treating the hydraulically connected selected axial intervals.

In some embodiments, selecting the axial intervals comprises at least one of setting well plugs, affixing sliding sleeves and perforating well pipe corresponding to the selected axial intervals.

In some embodiments, the treating comprises pumping a hydraulic fracture treatment.

In some embodiments, at least one treatment parameter is chosen based on the selected range.

In some embodiments, the at least one treatment parameter comprises at least one of hydraulic fracture fluid composition, hydraulic fracture fluid pumping rate, hydraulic fracture fluid proppant concentration and hydraulic fracture fluid proppant particle size distribution.

Other aspects and possible advantages will be apparent from the description and claim that follow.

BRIEF DESCRIPTION OF THE DRAWINGS

FIGS. 6A and 6B show spectrogram analysis of short-time Fourier transforms with overlapping, sliding windows; and autocorrelation analysis. Graphs such as these may be used to help reduce noise by eliminating known reflection points and expected wellbore resonant frequencies (either simulated or measured).

FIG. 9 shows an example workflow that can be implemented in optimizing subsequent (post-drilling) well treatment and completions.

FIG. 10 shows workflow flow chart of an example process for steering a drill bit into zones with more expected natural fracture occurrence, or avoiding rock formation zones that are poorly naturally fractured.

DETAILED DESCRIPTION

Figure 1:
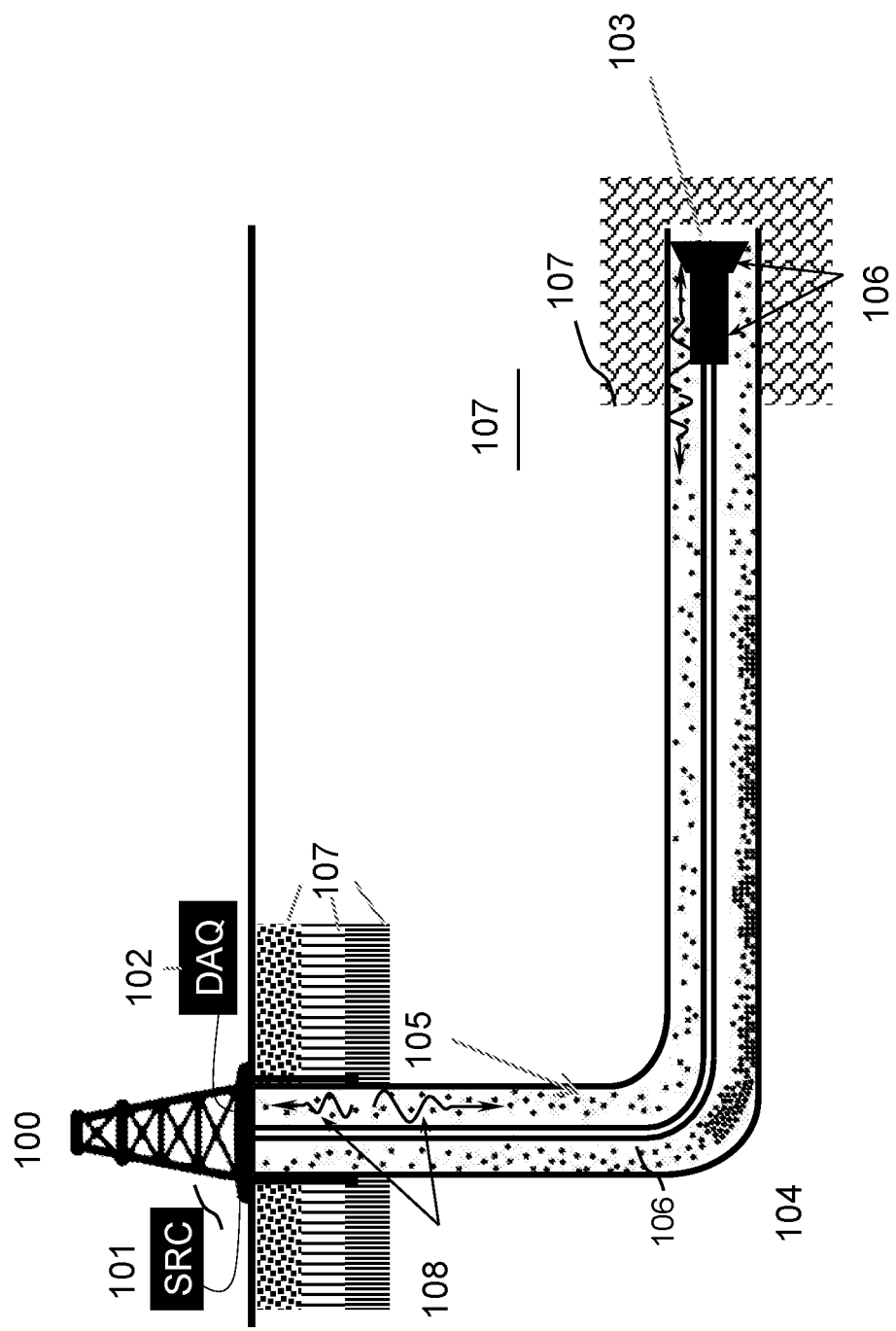
FIG. 1 shows a possible well data acquisition arrangement in a drilling operation setup according in the present disclosure.

For example, detecting formations with more natural fractures hydraulically connected to the well may be useful information for the well operator to later design an appropriate hydraulic fracturing treatment, and enhance hydrocarbon recovery for a given well section. Consequently, a "natural fracture density" log can be created alongside with the other commonly used logs.

A method according to the present disclosure can use various acoustic pulses generated by an "active" source disposed near the surface, by the drill bit encountering the formation, and by other operations-related means (e.g., casing insertion, pumps, valves opening and closing, etc.). These acoustic pulses or acoustic "noise" propagate up and down along the wellbore, typically as Stonely, or "tube waves" while reflecting at both longitudinal ends of the wellbore; as such, the tube waves can carry reflection signatures from the formations being drilled at the time. A typical wave frequency may vary from sub-Hz to a few kHz. In this case, the reflections can be inverted to estimate near-field rock properties (for example, hydraulic conductivity) in the vicinity of the wellbore bottom. Specifically, the near-field rock properties will contain information such as the density, occurrence, size, or effective hydraulic conductivity of natural fractures at the specific location where drilling occurs and the wellbore is exposed.

An acoustic instrument may be used to generate tube waves in the well by inducing pressure pulses (e.g., an abrupt change in fluid injection rate) at a location near the surface end of the well, i.e., the wellhead. Such pressure pulses are called "water hammer". The water hammer-induced tube waves reflect and such reflections carry information about the acoustic properties of the uncased region being drilled by the drill bit. Other acoustic sources and waves are also possible to use in the implementation of this invention, some akin to—for example—sonar-type transducers. Acoustic data is then detected by pressure transducer(s) or similar devices (e.g., hydrophones) and can be inverted to determine, e.g., near-field hydraulic conductivity as a proxy of 'local density' of and 'local quality' of natural fractures in real-time. One example inversion is described in US Patent Application Publication No. 2018/0320514 A1, but other possible acoustic analyses may be used.

During the drilling operation, the drill bit creates acoustic noises by the rotating apparatus crushing through the reservoir rock formation. In case of multiple known acoustic sources present (e.g., drill bit, pumping unit), additional filtering using standard techniques may take place to eliminate the less desired signals (e.g. to eliminate rotational frequency and resonance frequencies of the drill bit), or one can perform further signal conditioning to utilize or eliminate such pumping and undesirable noise signals.

The reservoir rock formation may be identified and highlighted in engineer's notes or logs based on measured near-wellbore conductivity as a proxy value of natural fracture occurrence, size, or density.

Each of these various regions may require a different hydraulic fracturing treatment to optimize hydrocarbon production. In particular, the operator may later avoid and treat less aggressively those regions with low natural fracture occurrence, while focusing more on the wellbore regions with high natural fracture conductivity occurrence (high near-wellbore conductivity). Other treatment design adjustments from a default design may be done differently to optimize the treatment—from casing perforation specifications to proppant and fluid volumes/types.

The information about the natural fracture system may also be used to generate a real-time natural fracture system log for geo-steering operations (e.g., to avoid or seek out more naturally fractured rock regions). The well operator may, based on other data from tools on the bottom hole assembly (BHA) choose to steer the drilling string into preferentially more naturally fractured rock regions.

For real-time well control information regarding the presence of encountered natural fractures during drilling and potential issues with fluid losses or kicks. Taking presence of natural fractures/regions of high fluid losses into account can reduce (by pumping more fluid) or avoid kicks and drilling issues, thus resulting in safer, lower-cost drilling operations.

A method according to this disclosure may be implemented for the initial investigation of the well and surrounding formations simultaneously during drilling operations.

Additionally, the drilling operations and data may be analyzed in real time or after the end of drilling operations. The resulting data presentations ("logs") and information may be of benefit to optimize any elements of a hydraulic fracturing design (perforation locations, stage plugs, types and quantities of fluid and proppant pumped, etc.). This method is applicable to cased, uncased, or sliding-sleeve completions.

In a typical well drilling operation as shown in FIG. 1, performed from a drilling platform, 100, a drill string, 106, traverses various rock formations 107, and zones in the subsurface with varied geophysical and geomechanical rock properties. A typical implementation of the present method may include a drilling system similar to FIG. 1. A pressure pulse source 101 may consist of a device(s) able to generate a water hammer or its pressure equivalent, for example, a piston that quickly releases or inserts a slug of fluid into the wellbore, but it can be substituted by an already present activity that generates tube waves (e.g. casing insertion). The source, 101, is intended to induce tube waves of varying frequencies (generally low HZ to kHz) in the wellbore. Other acoustic sources and waves are also possible to use in the implementation of this invention, as long as such source induces tube waves in the well. The tube waves travel up and down the inserted casing along wellbore, 105, as guide waves depicted by squiggly arrows 108 and reflect based on the presence of obstacles or changes and various objects in the well, 104. Such reflections travel back to the wellhead where they are detected by sensors, the signals from which may be processed in, e.g., a microcomputer (DAQ) unit, 102. The signals may be processed in the form of a time series of pressure measurements or pressure time derivative measurements made by one or more specially designed pressure transducers (e.g., hydrophones).

The sensor(s) and DAQ, 102, in this case may include hydrophone(s) and/or pressure transducer(s) with sufficient bandwidth to acquire signals on the order of 1 kHz without distortion or folding (aliasing). The sensors and source(s) may rig up (connect), in communication with the wellbore fluid, between blowout preventer (BOP) and the choke manifold or other suitable and safe location on the surface, which a drilling engineer may easily identify. A sensor location downhole (below surface in the well) is possible, especially if a sensor uses a signal channel such as optical fiber or wireline, if practical. A sensor location near the wellhead is convenient but not the only possible one; devices may be placed deeper inside the wellbore or on a surface near wellbore, or on a line hydraulically connected to the wellbore. The sensors need to be able to measure P(t) or dP/dt in the well.

A signal, 108 may be generated in the wellbore during the lag time between drill pipe connections or at a time interval predefined by the well operator using a controllable source, e.g., source 101. The signal 108 induced by the source 101 will travel through the wellbore annulus, meet the drill bit 103, whereupon part of the signal, 108 will be reflected from a drilling tool assembly called the "bottom hole assembly" (BHA), while another part of the signal will be diffused inside any system of natural fractures encountered at the drill bit 103 during drilling operations. In particular, during operations, the up and down traveling waves may generate and exhibit characteristic "signature" resonances that can be captured and analyzed.

Figure 2A:
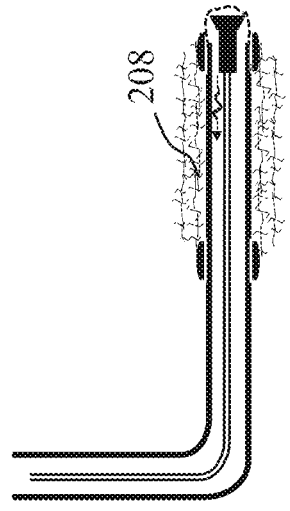
FIGS. 2A through 2D show diagrammatically an example implementation of the present method according to drilling operation steps in progress, with traveling acoustic waves 205.

FIG. 2A shows a drilling operation right after a "string" of casing 203 has been inserted into the drilled wellbore. When water hammer (or a similar acoustic pulse or waveform capable of inducing tube waves), 200, (equivalent to the signal shown at 108 in FIG. 1) is emitted in the wellbore, 201, the waves propagate along the wellbore and may reflect. The reflections, 202, travel back toward the wellhead (the surface end of the wellbore) from the bottom of the wellbore and drill string. Because the drill bit (103 in FIG. 1) is still at a location near the edge of the casing, 203, the signal reflected from the bottom of the well can be used as a benchmark to analyze any reflection not affected by the exposed reservoir formation adjacent to the wellbore. The signals reflected from the bottom of the wellbore may be recorded and used as a baseline measurement, because a minimum (or no) amount of reservoir rock is exposed to the acoustic signal (tube wave). Although the well depth at any time should typically be known to the well driller, the signal travel time can also be used to determine depth (axial location) of the drill bit 203 or any other obstacle within the wellbore.

Figure 2B:
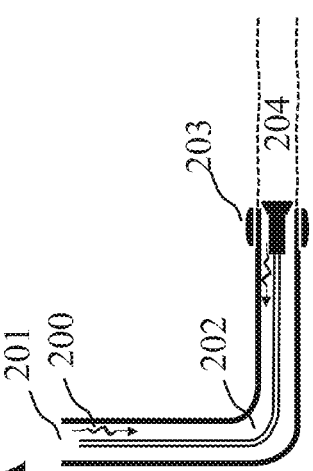

In FIG. 2B, as the drilling of wellbore, 201 progresses past the lowermost end of the casing (203 in FIG. 2A) and penetrates reservoir rock in its path, 204, the wellbore may connect to naturally existing fracture systems exposed by the continued drilling. The tube wave and acoustic reflections, 205, carry information related to properties of exposed natural fracture(s), 206. A baseline measurement made prior to further drilling, that is, within the fully cased well shown in FIG. 2A, may be helpful to eliminate the effects of the previously drilled formation region. The baseline measurement is not necessary for inverting subsequently detected signals to local hydraulic conductivity, but may be helpful in reducing noise by subtracting the effects of known reflection points between the two signals, or by narrowing a range of likely tube wave speeds or arrival times.

Figure 2C:
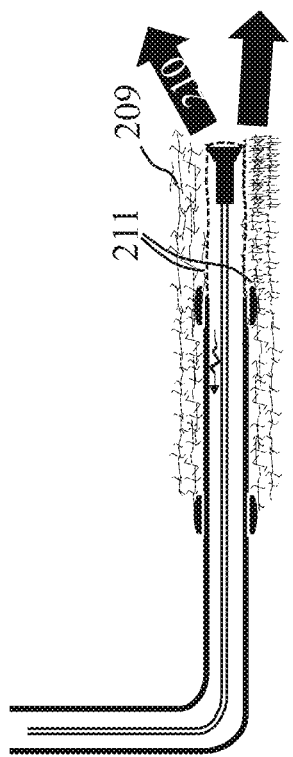
Figure 2D:
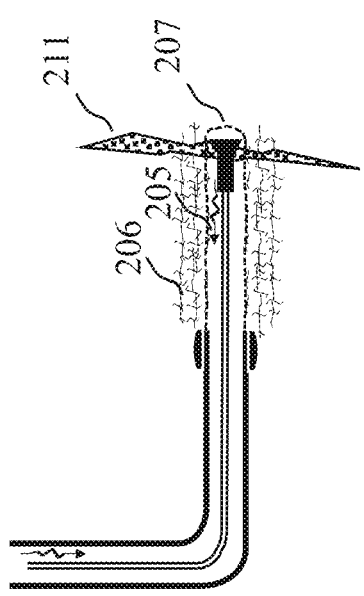

In FIG. 2C, a new casing segment, at 208, has been inserted into the drilled portion of the wellbore shown in FIG. 2B, effectively isolating any prior drilled segment and any therein existing natural fractures from the wellbore. In some cases, as the drilling operation continues, the drilling mud creates a filter cake deposit on the wall of the wellbore. This filter cake can hydraulically isolate the previously encountered natural fractures (e.g., drilling induced or naturally open). Referring to FIG. 2D, assuming that drilling continues, for example, beyond the casing point shown in FIG. 2C, newly analyzed data may not include the fracture systems previously covered with the drilling mud filter cake, dashed lines 211 in FIG. 2D. Open hole completions (without casing) are also applicable to this method, for example where the additional section fracture density is additive to the ones previously measured.

Knowing the zones of more preexisting natural fractures can enable the driller to adjust the well trajectory or "steer" the drill string, shown by arrows 210, into a preferential part of the formation, e.g., 209, with longer and/or higher density natural fractures based on a combination of data from the drill string, logs, models or other geophysical parameters, and natural fracture occurrence, 210. Conversely, the driller can avoid zones exhibiting poor measured natural fracture density.

Referring to the system and method for monitoring and evaluating fractures using tube wave acoustic waves as described in US Patent Application Publication No. 2018/0320514, Felkl et al., and incorporated herein by reference, in the near wellbore zone, the signal generated (depending on the frequency) at the wellhead may penetrate up to about 20 feet inside the fracture system that may be developed during pumping operations, and usually contains a sensitivity below about 1 Hz. These are used to estimate the near field fracture system characteristics such as width, length, complexity, and in particular the hydraulic conductivity $k_w$ to the wellbore. Any or all of the foregoing can be labeled as natural fracture quality or fracture density.

A log, or record with respect to well depth (or other depth reference) of fracture conductivity kw can identify zones along the well where fluid filled natural fractures are in existence. Using tube waves as in the present method allows for the identification of fluid filled natural fractures without the use of any downhole equipment or the necessity to run a downhole camera or log after the well is drilled. Traditional drilling well tools and logging while drilling tools do not have the capability to identify the existing natural fractures. In well logging known in the art, natural fractures can be identified by running special logging tools after the wells have been drilled and the wellbore is exposed to the formation. Well logging operations known in the art incur risk and are costly. The disclosed method allows for the characterization of natural fractures along the wellbore without the use of any downhole tools and without using substantial additional time to perform the logging activity.

Figure 3:
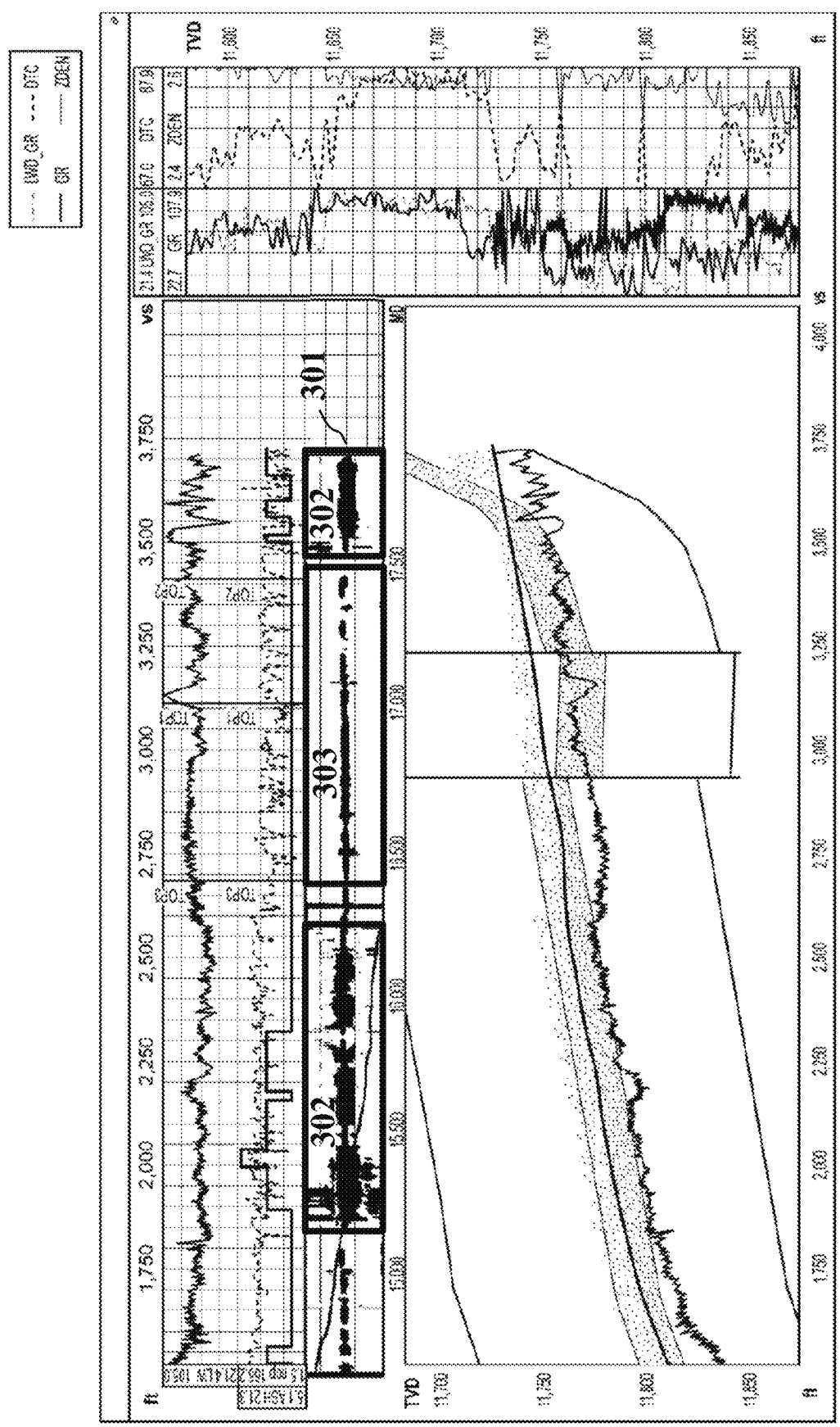
FIG. 3 shows an example of drilling log created with highlighted areas of low and high natural fracture incidence.

Instead of being confined to an isolated "stage" with perforations, the measurements according to the present disclosure are performed in a recently drilled, fully exposed formation, and thus can be interpreted more broadly as natural fracture density along the wellbore section rather than by the region or stratigraphic zone—by definition—connected through perforations using known well logging methods. Using such while drilling measurements, an additional "log" (plot with respect to depth) of natural fracture density or occurrence can be created during drilling to enhance existing or future logs as shown in FIG. 3. The zones of interest are identified in the Natural Fracture log curve 301, sections of which can be used to identify depths with high intensity (302) or low intensity (303) of natural fractures within the wellbore.

The natural fracture (density) "log" in itself is a unique property that is not determined while drilling using prior well logging techniques. In terms of trends or features of the natural fracture log, they may be interpreted at face value, that is, indications of higher natural fracture density may be easier to treat or to pump fluid into, and likely present better hydraulic conductivity for production of wellbore fluids from the well. Thus a natural fracture log made during drilling according to the present disclosure may help identify more suitable subsurface zones for fracture treatment without the need for after drilling evaluation of natural fractures.

A possible advantage of a method according to the present disclosure is that an equivalent log can generated as the drilling progresses, reducing cost and time and making the equivalent to or substitute for an "image log" available even to the wellbores that are cased. Selective targeting of subsurface near-wellbore zones is thus available. Additionally, the tube wave reflections can provide the capability to identify zones based on the dominant fluid(s) filling the fractures, e.g. gas, oil or water, since each of those fluids provides the rock formation with a different acoustic impedance.

Figure 4A:
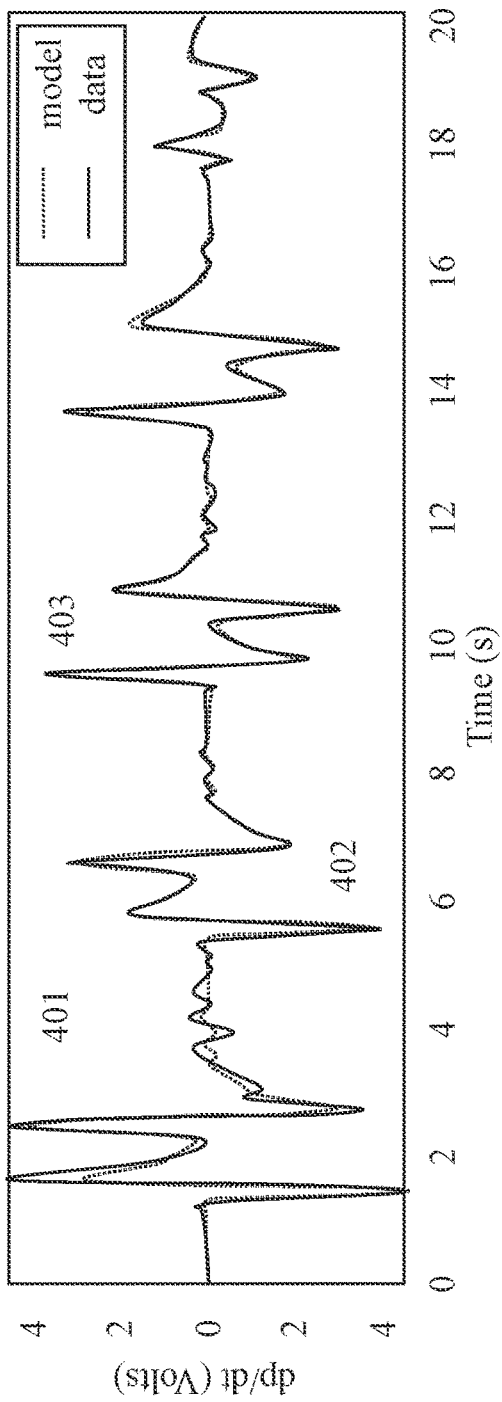
FIGS. 4A and 4B show surface-based tube-wave analysis to estimate near-field conductivity inversion from water hammer (tube wave, or more generally, acoustic wave) time and frequency domain signals).
Figure 4B:
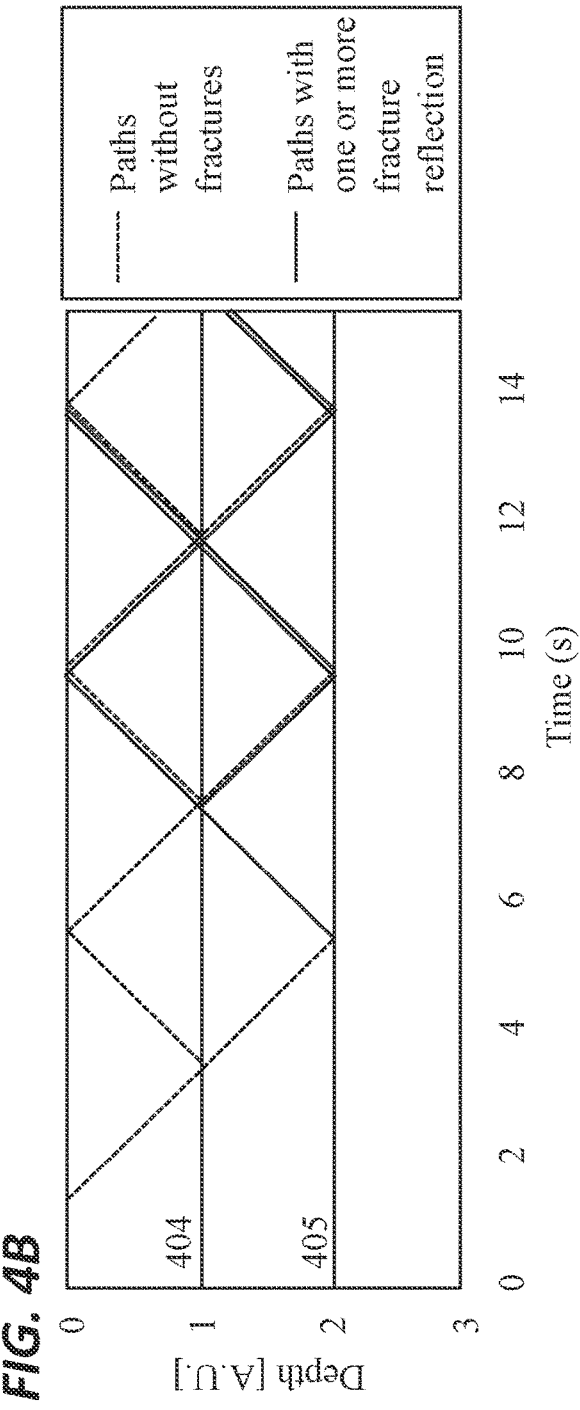

Each change in casing properties, e.g., diameter, wall thickness, metal composition, or open (uncased) hole diameter, e.g., due to drill bit diameter change, causes a change in tube wave impedance. Changes in impedance cause additional reflections in the detected tube waves. Therefore, it is important to use an inversion model that takes account of casing change and/or wellbore coverage. FIG. 4A shows the effect the propagation of tube waves (108) described by models having only a limited number of model parameters, including fracture conductivity, which is used as a proxy for natural fracture density. FIG. 4B shows the differentiation of paths in which acoustic impedance is reflected from fracture(s) at the depths such as fractures, drill string or drill bit (405), or casing change (404). The fracture system acoustic impedance can be defined as the pressure perturbation over the volumetric flow rate within the fracture system.

Figure 5:
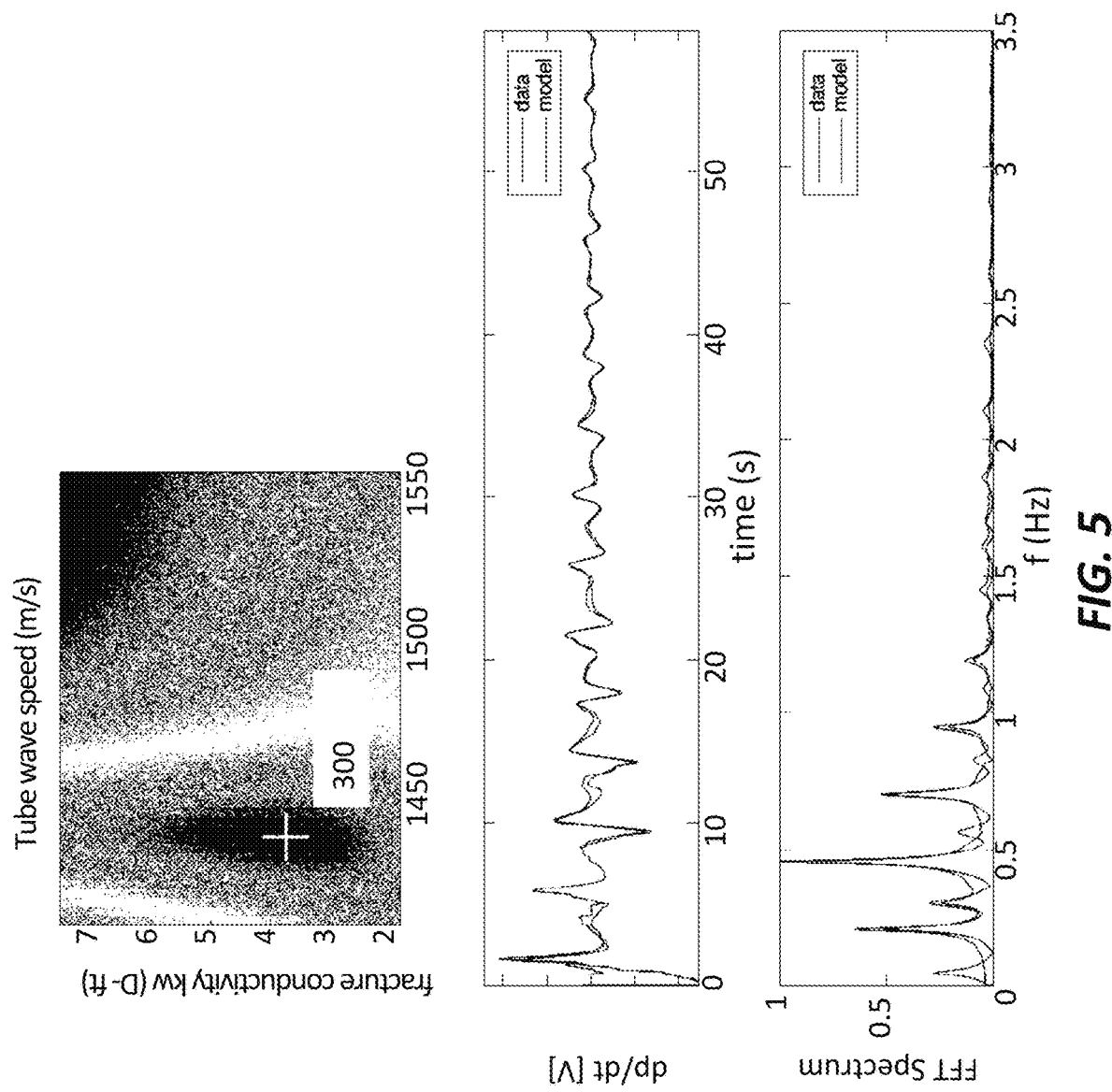
FIG. 5 shows an example of the best fit model matches tube wave reflection data in time and frequency domains for FIG. 4. A near wellbore (fracture) conductivity, (width*permeability product w*k) is determined.

FIGS. 4 and 5 in summary show an example inversion and data fit to arrive at a local fracture conductivity value of the exposed wellbore bottom.

FIG. 5 shows the comparisons between the model and recorded data in both the time domain FIG. 5 upper graph (i.e., full waveform inversion) and the frequency domain in the lower graph in FIG. 5 (i.e., matching frequencies and quality factors of resonant modes of the well and reservoir system). The best-fitting parameters determined by nonlinear optimization (right side of the figure) to minimize misfit in time and/or the frequency domain in full-waveform inversion can be used to solve for fracture system properties such as fluid viscosity, aperture, permeability, wellbore radius, the sum of fluid compressibility and pore compressibility times porosity. With reference to the present invention, the near-field fracture conductivity is a proxy measurement of the "quality" or occurrence (number and conductivity/width and even length) of naturally present fractures. A region with higher conductivity (factor k*w) will contain comparatively either more, or larger natural fractures than a region with a lower determined conductivity. Although the measurements can be made as absolute inversion, given a level of uncertainty in (for example) exact fluid properties, a relative measurement of successive wellbore sections for conductivity should be sufficient to highlight relatively lower and higher natural-fracture regions. Such measurements can be compared and calibrated based on other such measurements in similar wells in similar zones and rock formations.

In addition, analysis of the pulse returns enables monitoring changes in the wellbore/formation system during drilling operations. For example, at one time, an unexpected casing reflection may appear, which can look like a new reflection point 404 indicating a casing breach or collapse.

An example model that can be used for this inversion is that of Dunham et al. (Dunham et al. SEG, 2017) and US Patent Application Publication No. 2018/0320514 A1, incorporated herein by reference. Full waveform inversion can be used to determine conductivity ($C=k*w$ or $oC=Nkw/\mu$) of the fracture system measured as the product of permeability k and the width w of the fracture(s), or width of an "effective fracture" in the region. Tube wave reflections are influenced by acoustic source signature, acoustic wave velocity, wellbore attenuation, fluid properties, pressure, temperature, plug properties, plug depth (for drilling operations, the BHA or the drill bit can act as an acoustic isolating plug). Other methods, albeit not often used in drilling applications, could also allow measuring bottom hole properties, similar to conductivity. One example of which may be using downhole tools/probes, downhole acoustic tools, fiber optic sensing, video imaging, or even diagnostic mini-frac injection tests, temperature sensing, and radiation. However, some of these other methods may be costlier and less practical to implement.

Using spectrograms and/or autocorrelations, as shown in FIGS. 6A and 6B, (short-time Fourier transforms with overlapping, sliding windows) of the acoustic data acquired during the drilling operation may pinpoint unusual events such as fluid loss, or other operational difficulties as well as identify typical noise and resonance spectra either based on simulated data for a model wellbore or for actual drilling operation acoustic recording measurements. Generally, with the lengthening of the wellbore, the very low-frequency (related to the effective length of the wellbore drilled up to a point) resonant frequencies will shift from higher to lower, 601.

Directional drilling steering tools enable optimum placement of directional drilling within particular formations—e.g., hydrocarbon pay zones—based on downhole measurements such as resistivity, density or even biostratigraphy of the reservoir formation. The addition of fracture property determination using the tube wave acoustic measurement according to this disclosure adds a new type of formation information to adjust the directional drilling path.=By monitoring the directional drilling navigation logs with reference to natural fracture log properties, the well operator may ensure the drilling operation proceeds along a desired trajectory with acceptable effective hydraulic conductivity. For example, to improve the drilling trajectory and obtain optimum hydraulic conductivity, the present method can indicate to the rig operator if the trajectory has been toward more or less effective hydraulic conductivity. Consequently, in some embodiments, alerting the well operator to a well trajectory directed to decreasing effective hydraulic conductivity is desirable. This will be described in "Steering" section below.

Figure 7:
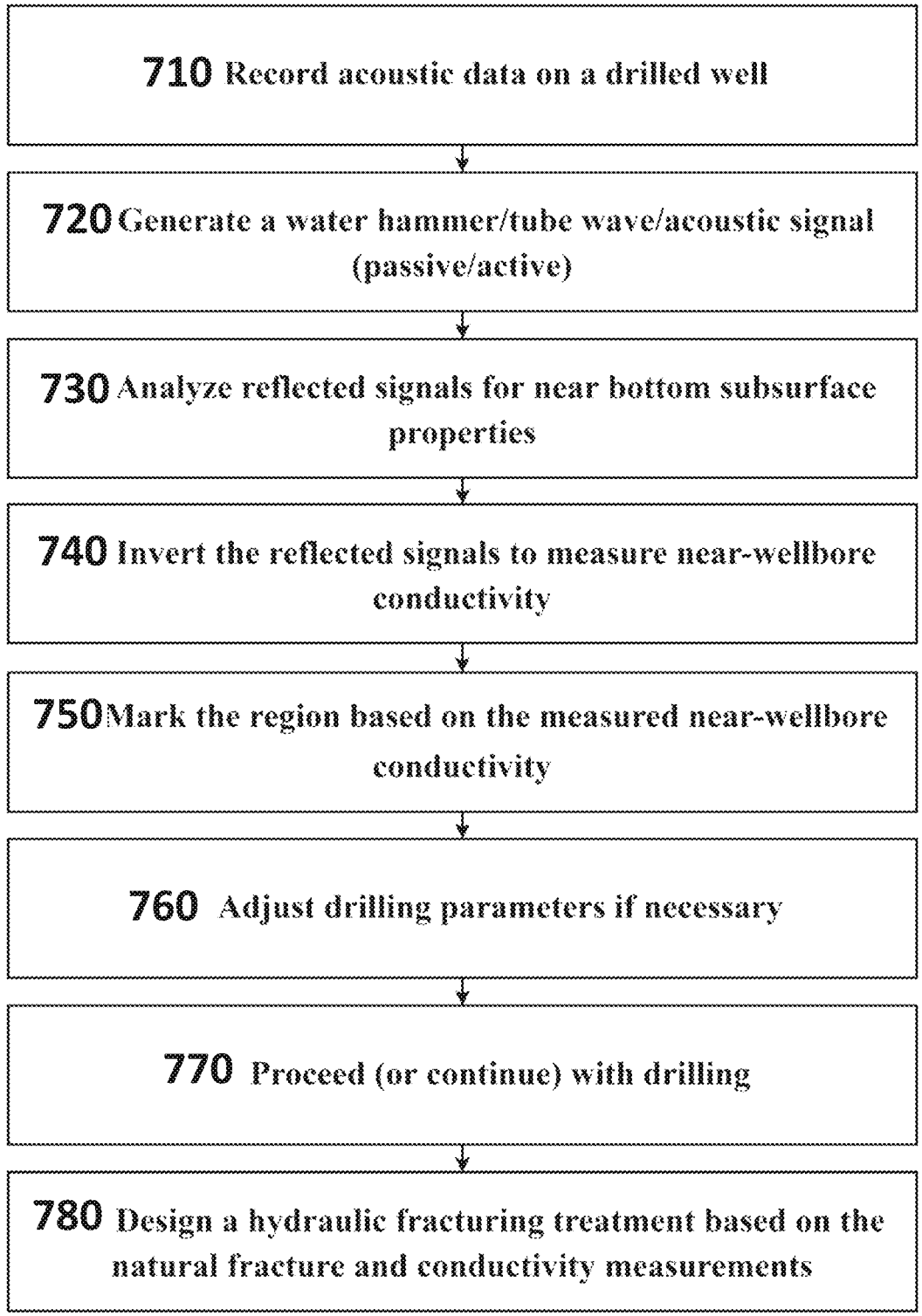
FIG. 7 shows an example flow chart for the process implemented according to this disclosure.

To implement a method according to this disclosure, refer to the flow chart of an example embodiment shown in FIG. 7.

At 710, record acoustic signals on a drilled well. An apparatus such as explained with reference to FIG. 1 may be used, although the specific apparatus in FIG. 1 is only an example of apparatus usable to obtain acoustic signals according to the present disclosure. At 720, generate an acoustic signal in the wellbore to induce tube waves. A water hammer or acoustic signal that propagates as tube waves may be generated, for example, by active pulsing, by removing or inserting a small volume of fluid into the wellbore, abruptly changing a fluid flowrate, opening/closing a valve, or turning a pump on/off. Additional ways of generating water hammer are known in the art and the foregoing examples are not intended to limit the scope of the present disclosure.

At 730, analyze reflected signals from the wellbore to determine formation properties proximate the bottom of the wellbore. The induced tube waves propagate along the wellbore and interact with formations proximate the wellbore, i.e., the near-wellbore region, in particular near the bottom of the wellbore where there are uncased (exposed) formations of interest.

At 740 the analyzed signals may be inverted to determine the near-field, near-wellbore facture conductivity. A non-limiting example method for determining near-wellbore fracture conductivity is disclosed in US Patent Application Publication No. 2018/0320514, filed by Felkl et al.

At 750 the determined section hydraulic conductivity is plotted (e.g., in drilling pipe-joint-length intervals) to form a log of well section hydraulic conductivity, which may be a proxy for "quality" of local natural fractures. High zone hydraulic conductivity, e.g., expressed relative to another well section (or another previously drilled or measured wellbore section), is indicative of a naturally higher fracture concentration. A scaled or non-scaled value of section hydraulic conductivity can be assigned for convenience of comparing different zones, rock formations, sections of wellbore and entire wells.

At 760, the well operator may choose to adjust the well trajectory (direction), the drilling speed, or other drilling parameters based on the determined local hydraulic conductivity. For example, the operator may adjust the trajectory to steer the well toward regions that are naturally more fractured, or to keep the well trajectory within a well-naturally fractured zone.

Based on data shown in FIG. 2B (see also FIG. 6A) a continuous display of the drilling operation is available to the well operator and may provide information for the drilling operator to modify some of the drilling parameters provided an unexpected or abrupt change in the general waterfall plot is observed. As part of this reconciliation the well operator can create or update a natural fractures/hydraulic conductivity map based on measurements. Any change in this step may or may not be carried to the next drilling segment.

The actions at 710 to 760 described above can be repeated as frequently and for as long as may be desirable along the drilled wellbore until drilling operation is complete.

At 770, based on the analysis at 760, the drilling/steering operation may be resumed either in a preplanned direction or along an adjusted direction.

At 780, appropriate fracture treatments may be designed. An overall map of the wellbore along the lateral or highly inclined part of the well, a) with macro resolution (active pulses), and b) micro resolution through the continuous hydrophone measurements can be useful in this step. This can be represented, for example, by a natural fracture density log as explained with reference to FIG. 3.

At 790, a hydraulic fracturing treatment may be designed based on the natural fracture and hydraulic conductivity determinations with respect to interpretation of the drilling log created. Additional steps to design a hydraulic fracturing treatment based on natural fracture log and conductivity measurements are shown with reference to the flow chart in FIG. 9. An operator or fracture treatment engineer can use the hydraulic conductivity log to inform better hydraulic fracturing design by selecting the appropriate fluid and proppant types, quantities, pumping rates, and perforating schema to best match the measured formation natural fracture parameters.

Well Steering

Referring to FIG. 10, generally, after some sections of the rock have been drilled and measurements made for determining the natural fracture properties as described above, the wellbore driller may choose to correlate the determined hydraulic conductivity values to some known lithology (e.g., from drill cuttings, MWD (measurement while drilling) logs, seismic surveys, etc.). As distinct formations or zones and properties become identifiable, the driller may choose to adjust the wellbore trajectory in drilling ahead to seek out more naturally fractured rock or avoid poorly fractured rock in the target formation. Such adjusting the trajectory can be done as follows:

At 1001, create a natural fracture "log" based on the measurements at a particular uncased segment. As the drilling operation progresses, the driller will take measurements at some positions along the wellbore and determine the natural fracture parameters as explained with reference to FIG. 7.

At 1002, correlate the "log" from 1001 to lithology or other known characteristics of the formation. The known characteristic of the rock determined from e.g., cuttings, seismic surveys, MWD, and other measurements can be correlated to the natural fracture measurements.

At 1003, continue drilling and create a natural fracture log at another position along the wellbore. At another position along the wellbore, another lithology may be encountered which has the same or different measured natural fracture properties as determined in the previous action at 1002

At 1004, correlate the natural fracture log at the next uncased segment to lithology. By measuring fracture properties as described in this disclosure, the known characteristic of the rock from e.g. cuttings, seismic surveys, MWD, and other measurements at this another segment of the wellbore can be correlated to the natural fracture measurements.

At 1005, Compare at least two segments of natural fracture logs with lithology. At least two segments, one of which could be the most recent one, of varying lithology and natural fracture parameters can be compared.

Figure 8A:
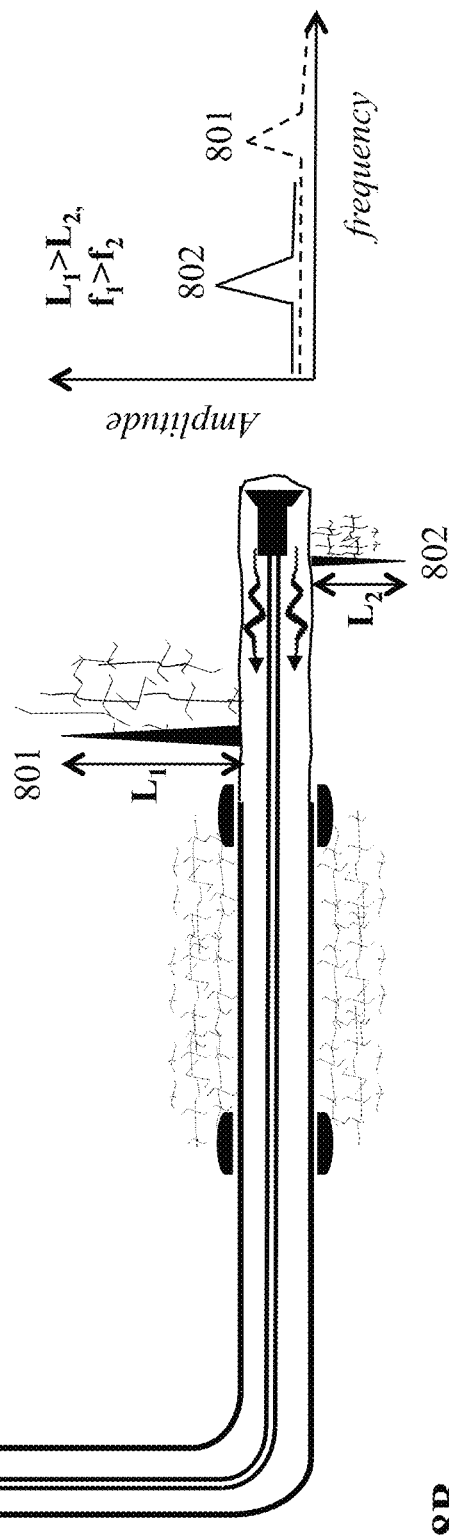
FIGS. 8A and 8B show how resonances during drilling may be related to some near wellbore properties, in FIG. 8A, namely characteristic length scale. This information may be observed in a spectrum as shown in FIG. 8B.
Figure 8B:
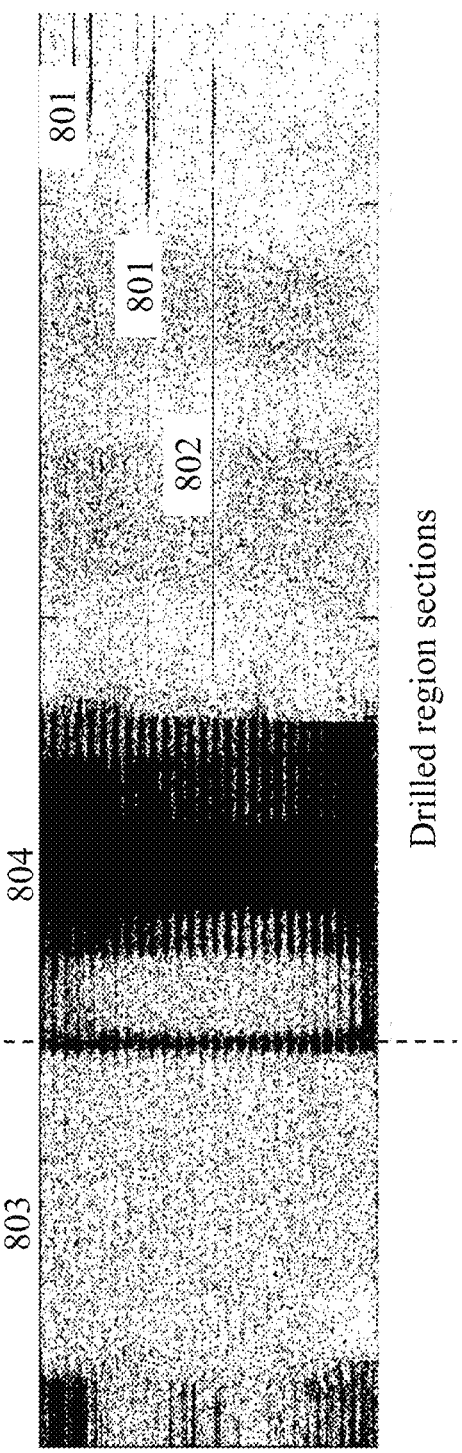

At 1006, adjust steering bit direction within allowed parameters to seek out preferred lithology to optimize (maximize) expected natural fracture occurrence or minimize poorly-naturally fractured rock formation. Based on the comparison at 1005, the driller may chose to: a. continue the drill path as planned, b. steer away from a less favorable lithology, c. steer towards a more favorable lithology A spectrum similar to that of FIG. 6A, 6B and FIG. 8B can be generated during the drilling operation (before or after a casing piece insertion). It may include coherent or known frequency of the drill bit, which can, if necessary, be driven to stay on a well-defined rotation speed, or sweep a range of frequencies. It may also include various resonances, 801, 802 and various regions of the wellbore with overall different "signatures", 804, 803. A characteristic resonance would indicate a characteristic dimension, e.g., assuming the wave speed of ~1400 m/s, a 35 Hz resonance would give a characteristic length of ~1400/35 (m/s/s)=~40 m. An abrupt change (e.g., at 805) may indicate a presence of a natural fault.

There is a difference between knowing locations of higher-natural fracture zones a priori (before even the fracturing design takes place) as compared to determining natural fracture properties afer the locations of casing perforations have been set and opened. An additional flowchart in FIG. 9 will describe the possible design modifications and implications.

Additionally, it is possible to use the information from these hydraulic conductivity determinations for customizing per-stage, or zone treatment to optimize the subsequent hydraulic fracturing and production as follows. Referring to FIG. 9, at 910. create a natural fracture "log" based on the above determinations explaine with reference to FIG. 7, and identify various zones (axial intervals) in the well corresponding to determined natural fracture conductivity (kw):
 a. with similar natural fracture conductivity
 b. with generally lower natural fracture conductivity
 c. with generally higher natural fracture conductivity
 d. with anomalous measurements of natural fracture conductivity At 920, prepare a hydraulic fracturing design taking the information from 910 into account. In this step, the completions engineer may adjust planned stage lengths, fluid and proppant volumes, pumping rates, fluid types, plug and diverter types, and many other treatment parameters based on the identified regions, standard practices, and experience. In particular one may follow actions including:
 a. The wellbore sections with similar natural fracture conductivity will be treated about the same to optimize production.
 b. The sections of the wellbore with poorer natural fracture conductivity may be skipped, treated more aggressively, or treated to establish a stronger near-wellbore conductive region instead of favoring longer fractures.
 c. The wellbore sections with higher natural fracture conductivity may be treated with larger amounts of proppant or faster rate than other regions. In addition, perforations may be placed preferentially to target such regions
 d. The wellbore sections with measured anomalies may require a customized approach depending on the anomaly (e.g., a fault).

At 920, based on a review of the natural fracture "log", the operator may use the natural fracture log map created during drilling and distinct changes in these regions may help placement of bridge plugs between treating stages.

At 930, treat the various regions of the well with separate designs to achieve optimally desired parameters. Such desired parameters may be fracture network geometry (e.g., length, height, width, complexity).

At 940, if necessary, adjust treatment of subsequent wells or zones based on information learned from 910-930. Once data on production and other factors is available, the engineer may use the information learned from one well to understand and optimize treatments of subsequent wells, provided a similar natural fracture log is available. The engineer may also make inferences on rock geomechanical properties and fracture measurements.

As an example of treatment choice a fracture engineer may make if the fracture log shows high natural fracture presence, the engineer would not use gel and use more slickwater with less proppant. If the natural fracture log shows poor existing natural fractures, the engineer may skip (unperforate or seal off by packers thus saving proppant cost) this region. However, if it is still to be treated, a gell may be used with larger amounts of proppant to compensate for the lack of natural fractures. Generally speaking, the regions of higher natural fracture density will—all else being equal—result in good wellbore connectivity but shorter fracture half-lengths when compared to a region with low natural fracture density. Those skilled in the art of fracturing can select more appropriate treatment based on the natural fracture log concentration to achieve their desired fracture geometry or reservoir stimulation.

Note that for the fracture design engineer, pre-casing natural fracture property measurements can be considered a benchmark when perforating (compare post-perforating hydraulic conductivity with the sum of natural conductivity in a zone, formation or region) or even post-fracturing. This could also help operator decide whether to reperforate if that difference it too large (empirically determined, but may be more than 10×). The perforations themselves obviously may increase the measured conductivity.

Additional use of the natural fracture logs can be in stratigraphy on vertical or deviated wells. For example, at least one region of certain natural fracture density at a particular identified depth in a first well can be correlated with a zone or formation exhibiting similar properties at a different depth in another (reasonably close or offset) well, thus helping geologists and petroleum engineers better understand local subsurface formation spatial distribution. Additionally, depending on a formation the high measured presence of natural fractures would point to a more brittle rock (higher Young's modulus) while less natural fractures may indicate a more ductile (lower Young's modulus) rock. Even though it is not their primary aim, in this way, such non-invasive measurements as described in the present invention can be used as a complement or instead of, for example, gamma ray log.

Figure 11:
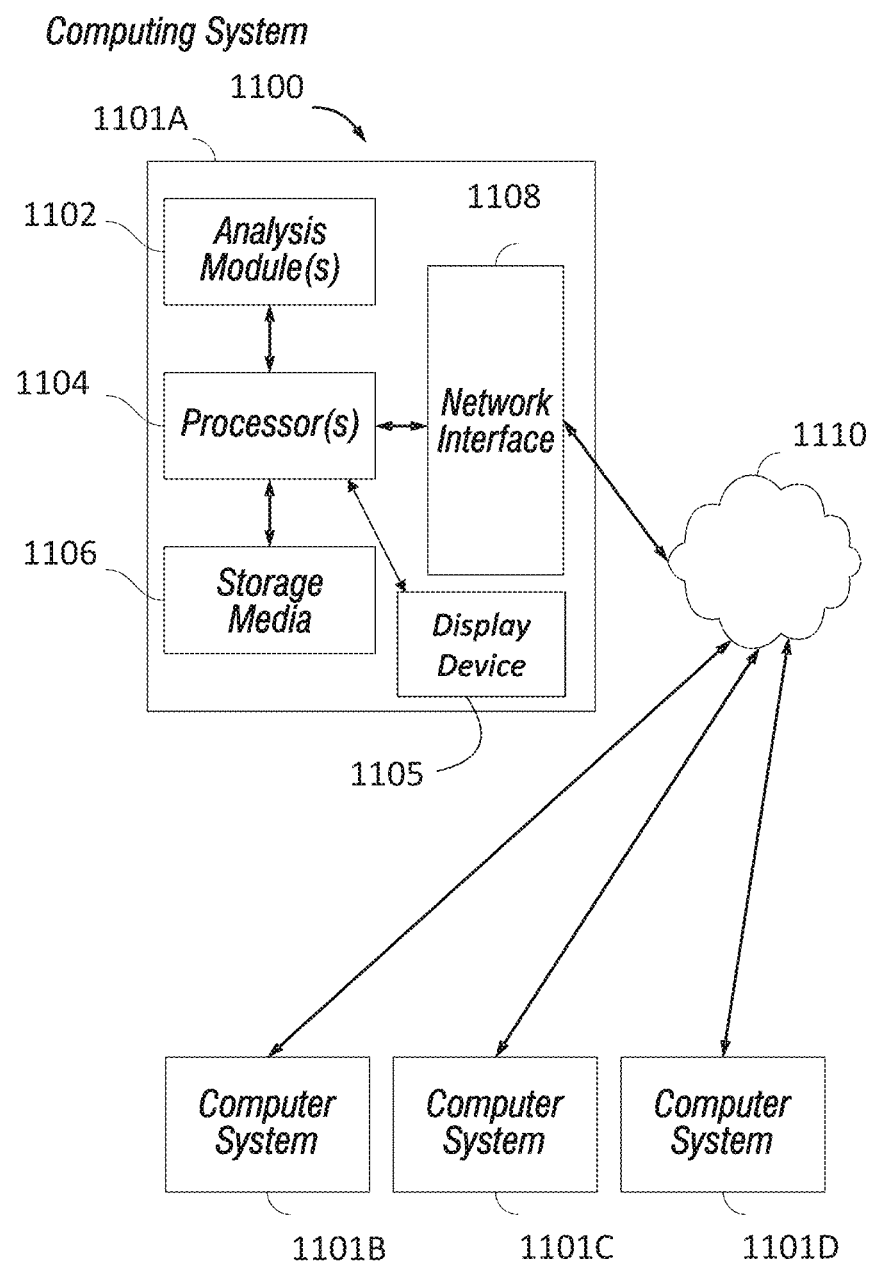
FIG. 11 shows an example embodiment of a computer system that may be used in some embodiments.

FIG. 11 shows an example computing system 1100 in accordance with some embodiments. The computing system 1100 may be an individual computer system 1101A or an arrangement of distributed computer systems. The individual computer system 1101A may include one or more analysis modules 1102 that may be configured to perform various tasks according to some embodiments, such as the tasks explained with reference to FIG. 11. To perform these various tasks, the analysis module 1102 may operate independently or in coordination with one or more processors 1104, which may be connected to one or more storage media 1106. A display device such as a graphic user interface of any known type may be in signal communication with the processor 1104 to enable user entry of commands and/or data and to display results of execution of a set of instructions according to the present disclosure.

The processor(s) 1104 may also be connected to a network interface 1108 to allow the individual computer system 1101A to communicate over a data network 1110 with one or more additional individual computer systems and/or computing systems, such as 1101B, 1101C, and/or 1101D (note that computer systems 1101B, 1101C and/or 1101D may or may not share the same architecture as computer system 1101A, and may be located in different physical locations, for example, computer systems 1101A and 1101B may be at a well drilling location, while in communication with one or more computer systems such as 1101C and/or 1101D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 1106 may be implemented as one or more computer-readable or machine-readable storage media. Note that while in the example embodiment of FIG. 11 the storage media 1106 are shown as being disposed within the individual computer system 1101A, in some embodiments, the storage media 1106 may be distributed within and/or across multiple internal and/or external enclosures of the individual computing system 1101A and/or additional computing systems, e.g., 1101B, 1101C, 1101D. Storage media 1106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 1100 is only one example of a computing system, and that any other embodiment of a computing system may have more or fewer components than shown, may combine additional components not shown in the example embodiment of FIG. 11, and/or the computing system 1100 may have a different configuration or arrangement of the components shown in FIG. 11. The various components shown in FIG. 11 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for optimizing well completion based on pre-existing natural fracture properties comprising:
   determining at least one of a naturally occurring rock property, a naturally occurring near wellbore hydraulic conductivity, and natural fracture occurrence during drilling the well using detected reflections from tube waves propagating in the well;
   creating a record with respect to axial position along the well of the at least one of a naturally occurring rock property, a naturally occurring near well hydraulic conductivity and natural fracture occurrence;
   selecting axial intervals in the well having the at least one of a naturally occurring rock property, a naturally occurring near well hydraulic conductivity and natural fracture occurrence being within a selected range; and
   hydraulically connecting the selected axial intervals to the well and treating the hydraulically connected selected axial intervals.

2. The method of claim 1 wherein selecting the axial intervals comprises at least one of setting well plugs, affixing sliding sleeves and perforating well pipe corresponding to the selected axial intervals.

3. The method of claim 1 wherein the treating comprises pumping a hydraulic fracture treatment.

4. The method of claim 1 wherein at least one treatment parameter is chosen based on the selected range.

5. The method of claim 4 wherein the at least one treatment parameter comprises at least one of hydraulic fracture fluid composition, hydraulic fracture fluid pumping rate, hydraulic fracture fluid proppant concentration and hydraulic fracture fluid proppant particle size distribution.

6. The method of claim 1 wherein the tube waves are induced by generating pressure pulses in the well proximate a surface end of the well.

7. The method of claim 6 wherein the pressure pulses are generated during drill pipe connections.

8. The method of claim 1 wherein tube waves reflected from a bottom of the well are used as a baseline to evaluate properties of formations unaffected by drilling the well.

9. The method of claim 1 further comprising recording reflected tube waves from within a well casing prior to drilling the well below the well casing to provide a known tube wave reflection point reference for subsequent reflected tube wave measurements in the well during drilling.

10. The method of claim 1 further comprising identifying permeable intervals in the well during drilling by identifying intervals from the detected reflected tube waves showing decreasing permeability over time as drilling continues, wherein the decreasing permeability is attributable to build up of filter cake on the identified intervals.

\* \* \* \* \*